(12) United States Patent
Chen (10) Patent No.: US 10,423,383 B2
(45) Date of Patent: Sep. 24, 2019

(54) INTELLIGENT PLAYBACK SYSTEM, WEARABLE DEVICE AND MAIN UNIT

(71) Applicant: BOE TECHNOLOGY GROUP CO., LTD., Beijing (CN)

(72) Inventor: Liqiang Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 149 days.

(21) Appl. No.: 15/341,375

(22) Filed: Nov. 2, 2016

(65) Prior Publication Data
US 2017/0228212 A1 Aug. 10, 2017

(30) Foreign Application Priority Data
Feb. 5, 2016 (CN) .......................... 2016 1 0082379

(51) Int. Cl.
*G09G 5/00* (2006.01)
*G06F 3/16* (2006.01)
*G06F 3/01* (2006.01)
*G06F 1/16* (2006.01)

(52) U.S. Cl.
CPC ............ *G06F 3/165* (2013.01); *G06F 1/1652* (2013.01); *G06F 3/011* (2013.01); *G06F 3/017* (2013.01); *G06F 1/163* (2013.01); *H04S 2400/01* (2013.01)

(58) Field of Classification Search
CPC .......... G06F 3/165; G06F 3/001; G06F 3/017; G06F 3/163; G06F 3/0482; G06F 3/04842; G06F 3/04847; G06F 3/04883; G06F 1/1652; G06F 1/163; H04S 2400/01

USPC .......................................................... 715/716
See application file for complete search history.

(56) References Cited

U.S. PATENT DOCUMENTS

| | | | | |
|---|---|---|---|---|
| 2002/0186961 | A1* | 12/2002 | Kikuchi | G11B 19/04 386/248 |
| 2010/0066664 | A1* | 3/2010 | Son | G06F 1/163 345/156 |
| 2014/0201126 | A1* | 7/2014 | Zadeh | G06K 9/627 706/52 |
| 2014/0280156 | A1* | 9/2014 | Maser | G11B 27/031 707/737 |
| 2015/0302840 | A1* | 10/2015 | Button | G06F 3/011 340/4.42 |
| 2016/0004499 | A1* | 1/2016 | Kim | G06F 3/167 715/716 |
| 2016/0231981 | A1* | 8/2016 | Lin | G06F 3/165 |

* cited by examiner

*Primary Examiner* — Scott T Baderman
*Assistant Examiner* — Hassan Mrabi
(74) *Attorney, Agent, or Firm* — Ladas & Parry LLP (57) ABSTRACT

An intelligent playback system, comprising: a wearable device, a main unit and a playback unit, wherein, the wearable device is configured to generate an audio instruction signal in the case of action of a user and send the audio instruction signal to the main unit; the main unit is configured to process an audio signal on the basis of the audio instruction signal, generate a playback signal, and send the playback signal to the playback unit; and the playback unit is configured to play the playback signal. The control of the audio processing device can be achieved, and hence the real-time interaction between the wearable device and the audio processing device can be achieved. And a wearable device and a main unit are also provided.

12 Claims, 4 Drawing Sheets

INTELLIGENT PLAYBACK SYSTEM, WEARABLE DEVICE AND MAIN UNIT

TECHNICAL FIELD

Embodiments of the present disclosure relate to an intelligent playback system, a wearable device and a main unit.

BACKGROUND

Currently, wearable devices are more and more widely applied in people's lives. The wearable devices such as intelligent spectacles and intelligent watches increase the environmental perception degree of people by monitoring body information or external information, and hence enhance user experience.

The conventional wearable device can passively receive information and send the information to a user. However, the wearable device cannot actively send an instruction of the user, cannot control an audio processing device, and hence cannot achieve the real-time interaction with the audio processing device.

SUMMARY

According to at least one embodiment in the disclosure, an intelligent playback system is provided, comprising: a wearable device, a main unit and a playback unit, wherein, the wearable device is configured to generate an audio instruction signal in the case of action of a user and send the audio instruction signal to the main unit; the main unit is configured to process an audio signal on the basis of the audio instruction signal, generate a playback signal, and send the playback signal to the playback unit; and the playback unit is configured to play the playback signal.

According to at least one embodiment in the disclosure, a wearable device is provided, comprising: an action signal identification module, a first signal processing module and a first signal sending module, wherein, the action signal identification module is configured to identify an audio action signal in the case of action of a user; the first signal processing module is configured to generate an audio instruction signal by processing the audio action signal; and the first signal sending module is configured to send the audio instruction signal to indicate the play of audio data.

According to at least one embodiment in the disclosure, a main unit is provided, comprising: a first signal receiving module, an audio processing module, a second signal processing module and a second signal sending module, wherein, the first signal receiving module is configured to receive an audio instruction signal sent by a wearable device; the second signal processing module is configured to obtain a playback signal by processing an audio signal on the basis of the audio instruction signal; and the second signal sending module is configured to send the playback signal for the play of the playback signal.

DETAILED DESCRIPTION

The technical solutions of the embodiments will be described in a clearly and fully understandable way in connection with the drawings related to the embodiments of the invention. Apparently, the described embodiments are just a part but not all of the embodiments of the invention.

For better understanding of the technical proposals of the present disclosure by those skilled in the art, detailed description will be given below to intelligent playback system and method, a wearable device, a main unit and a playback unit provided by the present disclosure with reference to the accompanying drawings.

Figure 1:
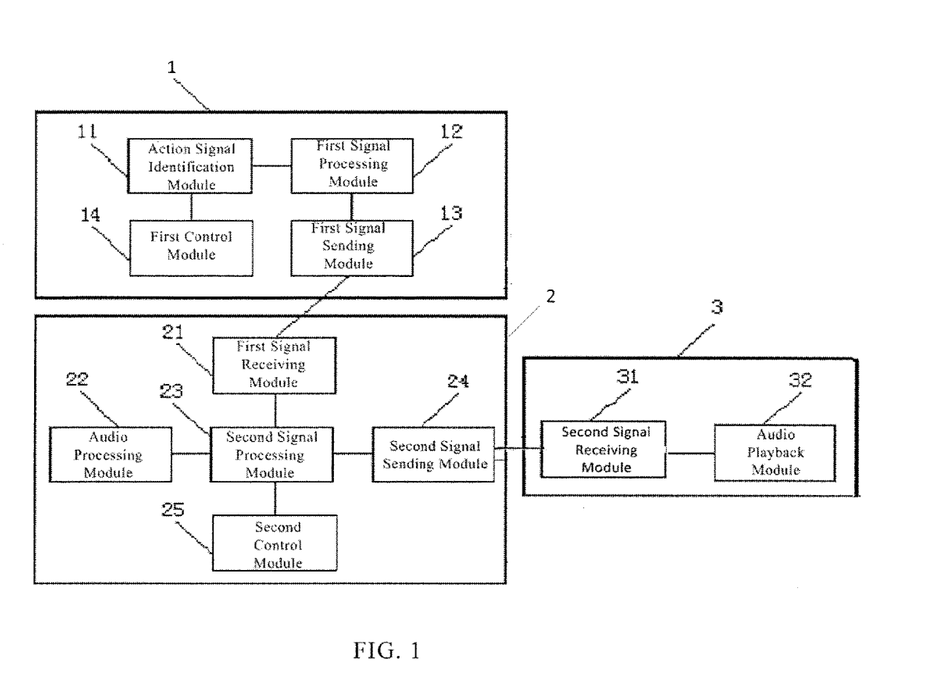
FIG. 1 is a schematic structural view of an intelligent playback system provided by the first embodiment of the present disclosure.

FIG. 1 is a schematic structural view of an intelligent playback system provided by the first embodiment of the present disclosure. As illustrated in FIG. 1, the system comprises: a wearable device 1, a main unit 2 and a playback unit 3. The wearable device 1 is configured to generate an audio instruction signal in the case of action of a user, and send the audio instruction signal to the main unit 2. For instance, the audio instruction signal includes audio processing modes corresponding to different tracks. The main unit 2 is configured to process audio data according to the audio instruction signal, for instance, divide an audio signal into different tracks, match different tracks of the audio signal with the audio instruction signal, obtain a waiting playback signal by the audio processing of a track matched with the audio instruction signal according to corresponding audio processing mode, and send the waiting playback signal to the playback unit. The playback unit 3 is configured to play the waiting playback signal.

The main unit 2 may match different tracks of the audio signal with the audio processing modes corresponding to different tracks in the audio instruction signal. If a track in the audio signal is matched with an audio processing mode corresponding to the track in the audio instruction signal, it indicates that the track is matched with the audio instruction signal, and hence the playback signal is obtained by the audio processing of the track according to corresponding audio processing mode.

In the embodiment, the wearable device, for instance, may be a device such as an intelligent wrist strap, an intelligent watch and intelligent spectacles. The user may wear the wearable device 1. For instance, the wearable device 1 may be worn on a finger or the wrist of the user and may also be worn in other parts.

In the embodiment, the wearable device 1 is specifically configured to identify an audio action signal in the case of action of the user, generate an audio instruction signal by processing the audio action signal, and send the audio instruction signal to the main unit 2. For instance, the audio action signal is subjected to waveform modulation. Waveform modulation may include filtering and detection. For instance, the wearable device 1 includes an action signal identification module 11, a first signal processing module 12 and a first signal sending module 13. The action signal identification module 11 is configured to identify an audio action signal in the case of action of the user. For instance, the action signal identification module 11 may include a gesture sensor or a body sensor. For instance, the action signal identification module 11 may be a device capable of identifying the action such as an acceleration sensor, a gravity sensor and a camera. For instance, the action signal identification module 11 may be an acceleration sensor. In the case of action of the user, the acceleration sensor may detect the audio action signal, wherein when fingers of the user give out different actions, different audio action signals may be detected. The first signal processing module 12 is configured to generate an audio instruction signal by the waveform modulation of the audio action signal. The first signal processing module 12, for instance, may be a universal processor, a special processing chip, etc. In general, the audio signal includes a plurality of tracks, and the tracks may correspond to sound effects or musical instruments. For instance, the sound effects may include classical, pop, rock or the like, and the musical instruments may include piano, violin, guitar, etc. When one or more tracks in the audio signal must be subjected to audio processing, the wearable device 1 may be adopted to generate an audio instruction signal. The audio instruction signal may include audio processing modes corresponding to different tracks. For instance, the audio processing mode may include amplification, bassy, etc. For instance, if a track corresponding to piano in the audio signal must be subjected to amplification, the generated audio instruction signal is amplification. The action of a finger of a user corresponding to the audio instruction signal may be set as required. For instance, a finger equipped with the wearable device 1 is adopted to draw a circle. The first signal sending module 13 is configured to send the audio instruction signal to the main unit 2. The first signal sending module 13 may send the audio instruction signal to the main unit 2 by Bluetooth, infrared or WIFI communication mode. In the embodiment, the first signal sending module 13 may send the audio instruction signal to the main unit 2 by Bluetooth communication mode. In the embodiment, according to one example of the present disclosure, the wearable device 1 may be a ring. Thus, the wearable device 1 may be sleeved on a finger of a user, and the action of the user is the action of the finger of the user. In the case of action of the finger of the user, the wearable device 1 may be driven to produce corresponding action. For instance, the action of the finger of the user may be drawing a "cross", drawing a "straight line" or the like, and the action of the wearable device 1 is also drawing a "cross", drawing a "straight line", etc. In actual application, the wearable device 1 may also be other devices, e.g., a wrist strap.

The main unit 2 may be a structure having music play function, e.g., a smart mobile phone, an MP3, an MP4 or a tablet PC. The main unit 2 may include a first signal receiving module 21 (e.g., including a wireless transmission device, a Bluetooth device and a modem), an audio processing module 22 (e.g., may be a microprocessor chip, audio processing software or firmware), a second signal processing module 23 (e.g., may be a microprocessor chip, audio processing software or firmware) and a second signal sending module 24 (e.g., including a wireless transmission device, a Bluetooth device, a modem, an antenna, etc.). The first signal receiving module 21 is configured to receive an audio instruction signal sent by the wearable device 1. The audio instruction signal includes audio processing modes corresponding to different tracks. The audio processing module 22 is configured to divide an audio signal into different tracks. The first signal processing module 23 is configured to match different tracks of the audio signal with the audio instruction signal, and obtain a playback signal by the audio processing of a track matched with the audio instruction signal according to corresponding audio processing mode. For instance, if the audio instruction signal is amplification of a track corresponding to piano, the second signal processing module 23 is configured to match the track in the audio signal with the track corresponding to piano in the audio instruction signal, obtain the track corresponding to piano in the audio signal, and obtain a playback signal by the amplification of the track corresponding to piano in the audio signal. The second signal sending module 24 is configured to send the playback signal to the playback unit 3. Wherein, the first signal receiving module 21 is configured to receive the audio instruction signal sent by the first signal sending module 13, and send the received audio instruction signal to the first signal processing module 12.

The playback unit 3 may be headphones, speakers or a sound box. The playback unit 3 may include a second signal receiving module 31 and an audio playback module 32. The second signal receiving module 31 is configured to receive the playback signal. The audio playback module 32 is configured to play the playback signal.

For instance, the wearable device 1 may also be configured to switch on or off. The wearable device further comprises a first control module 14. The first control module 14 is configured to generate an on signal or an off signal and send the on signal or the off signal to the action signal identification module 11. The first control module 14 may generate an on signal or an off signal according to an instruction given out by the user. For instance, a ring key is disposed on the wearable device 1 and connected with the first control module 14 and may include an on key and an off key. The user may give out an instruction for generating an on signal to the first control module 14 by pressing the on key, and the first control module 14 is configured to generate the on signal according to the instruction for generating the on signal. Or the user may give out an instruction for generating an off signal to the first control module 14 by pressing the off key, and the first control module 14 is configured to generate the off signal according to the instruction for generating the off signal. The action signal identification module 11 is configured to turn on when receiving the on signal, and execute the step of identifying the audio action signal in the case of action of the user. That is to say, in the case of action of the user, the action signal identification module 11 identifies the action of the finger and obtains the audio action signal. The action signal identification module 11 is configured to turn off when receiving the off signal, and stop executing the step of identifying the audio action signal in the case of action of the user. That is to say, in the case of action of the user, the action signal identification module 11 does not identify the action of the finger, and at this point, the wearable device 1 stops working.

For instance, the wearable device 1 is also configured to generate an audio instruction signal according to vibration mode. That is to say, the wearable device 1 works in accordance with vibration mode. Vibration occurs in the case of action of the user. At this point, the wearable device 1 may obtain the audio instruction signal by identifying the vibration caused by the action of the finger. The first control module 14 is configured to generate a vibration mode signal and send the vibration mode signal to the action signal identification module 11. The action signal identification module 11 may work in accordance with vibration mode after receiving the vibration mode signal, namely the action signal identification module 11 obtains an audio action signal by identifying the vibration caused by the action of the user.

For instance, the wearable device 1 may also be configured to generate an audio instruction signal according to direction mode. That is to say, the wearable device 1 works in accordance with direction mode. Motion direction is produced in the case of action of the user. At this point, the wearable device 1 may obtain the audio instruction signal by identifying the direction of the action. The first control module 14 is configured to generate a direction mode signal and send the direction mode signal to the action signal identification module 11. The action signal identification mode 11 may work in accordance with direction mode after receiving the direction mode signal, namely the action signal identification module 11 obtains an audio action signal by identifying the direction of the action of the user. For instance, when the action of the finger of the user is vertical motion, the audio instruction signal generated by the wearable device 1 is an audio processing mode corresponding to a piano track. When the action of the finger of the user is horizontal motion, the audio instruction signal generated by the wearable device 1 is an audio processing mode corresponding to a guitar track.

For instance, the main unit 2 is also configured to generate a processing control signal. The processing control signal may include a processing signal or a pending signal. When the processing control signal includes the processing signal, the main unit is configured to execute the steps of dividing the audio signal into different tracks, matching different tracks of the audio signal with the audio instruction signal, and obtaining the playback signal by the audio processing of the track matched with the audio processing mode according to the audio processing mode. When the processing control signal includes the pending signal, the audio signal may be directly taken as the playback signal and is not subjected to audio processing. The main unit 2 further comprises a second control module 25. The second control module 25 is configured to generate a processing control signal and send the processing control signal to the second signal processing module 23. The second control module 25 may generate a processing signal or a pending signal according to an instruction given out by the user. For instance, a main key is disposed on the main unit 2 and connected with the second control module 25 and may include a processing key and a pending key. The user may give out an instruction for generating a processing signal to the second control module 25 by pressing the processing key, and the second control module 25 is configured to generate the processing signal according to the instruction for generating the processing signal. Or the user may give out an instruction for generating a pending signal to the second control module 25 by pressing the pending key, and the second control module 25 is configured to generate the pending signal according to the instruction for generating the pending signal. When the processing control signal includes the processing signal, the second signal processing module 23 is configured to match different tracks of the audio signal with the audio instruction signal and obtain the playback signal by the audio processing of a track matched with the audio processing mode according to the audio processing mode. When the processing control signal includes the pending signal, the second signal processing module 23 may directly take the audio signal as the playback signal, does not perform audio processing on the audio signal, and sends the playback signal to the second signal sending module 24. This proposal is the proposal of allowing the main unit 2 to control whether to process the audio signal.

For instance, the wearable device 1 is also configured to generate a switch instruction signal in the case of action of the user and send the switch instruction signal to the main unit 2. The switch instruction signal includes a start instruction or an end instruction. For instance, when the action of the finger of the user is drawing a "cross", the switch instruction signal is the start instruction; and when the action of the finger of the user is drawing a "straight line", the switch instruction signal is the end instruction. The wearable device 1 is configured to generate a switch action signal in the case of action of the user, generate a switch instruction signal by the waveform modulation of the switch action signal, and send the switch instruction signal to the main unit 2. When the switch instruction signal includes the start instruction, the main unit 2 is configured to execute the steps of dividing the audio signal into different tracks, matching different tracks of the audio signal with the audio instruction signal, and obtaining the playback signal by the audio processing of the track matched with the audio instruction signal according to corresponding audio processing mode. When the switch instruction signal includes the end instruction, the main unit 2 may directly take the audio signal as the playback signal and does not perform audio processing on the audio signal. The action signal identification module 11 is configured to generate a switch action signal in the case of action of the user. The first signal processing module 12 is configured to generate a switch instruction signal by the waveform modulation of the switch action signal. The first signal sending module 13 is configured to send the switch instruction signal to the first signal receiving module 21. The first signal receiving module 21 is configured to send the switch instruction signal to the second signal processing module 23. When the switch instruction signal is the start instruction, the second signal processing module 23 is configured to match different tracks of the audio signal with the audio instruction signal and obtain the playback signal by the audio processing of the track matched with the audio instruction signal according to corresponding audio processing mode. When the switch instruction signal is the end instruction, the second signal processing module 23 may directly take the audio signal as the playback signal, does not perform audio processing on the audio signal, and sends the playback signal to the second signal sending module 24. This proposal is the proposal of allowing the wearable device 1 to control whether to process the audio signal.

In the technical proposal of the intelligent playback system provided by the embodiment, the wearable device generates the audio instruction signal in the case of action of the user; the main unit divides the audio signal into different tracks, matches different tracks of the audio signal with the audio instruction signal, and obtains the playback signal by the audio processing of the track matched with the audio instruction signal according to corresponding audio processing mode; and the playback unit plays the playback signal. In the embodiment, the wearable device may actively send the instruction of the user to the audio processing device, so that the control of the audio processing device can be achieved, and hence the real-time interaction between the wearable device and the audio processing device can be achieved. Wherein, the audio processing device in the present disclosure refers to the main unit 2 and/or the playback unit 3.

Figure 2:
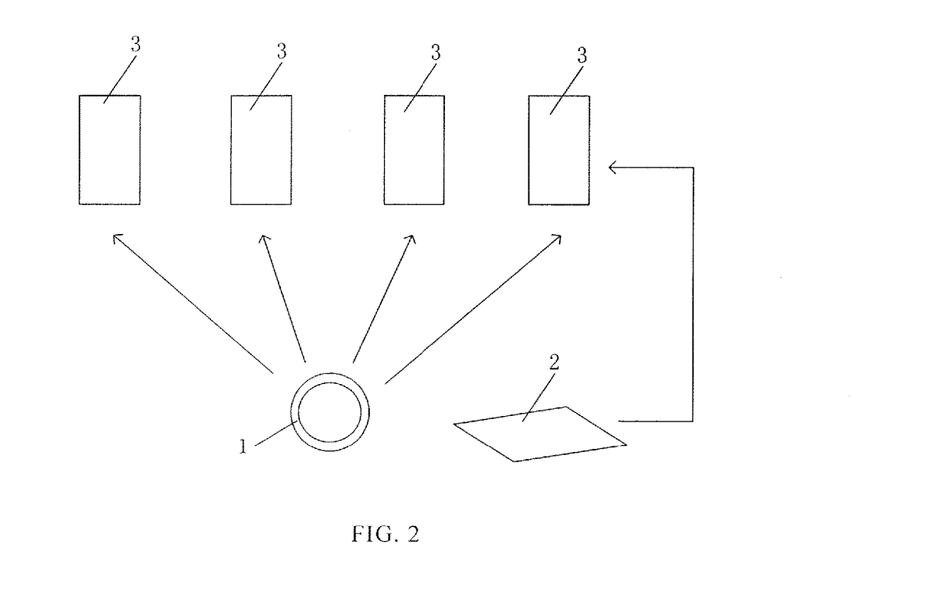
FIG. 2 is a schematic structural view of an intelligent playback system provided by the second embodiment of the present disclosure.
Figure 3:
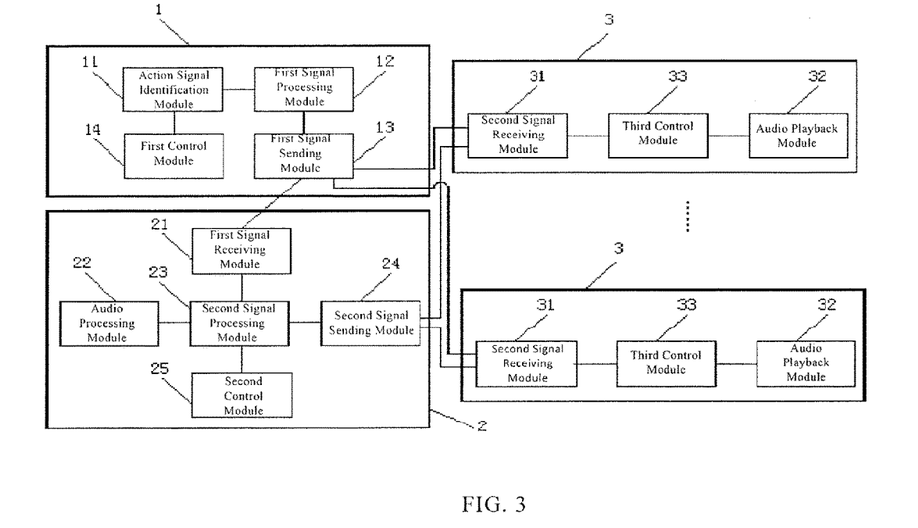
FIG. 3 is a specific schematic structural view of units in FIG. 2.

FIG. 2 is a schematic structural view of an intelligent playback system provided by the second embodiment of the present disclosure. FIG. 3 is a specific schematic structural view of units in FIG. 2. As illustrated in FIGS. 2 and 3, the difference between the embodiment and the first embodiment is that the number of the playback units 3 is multiple. The wearable device 1 is also configured to generate a select instruction signal in the case of action of the user and send the select instruction signal to corresponding playback unit 3. The playback unit 3 is specifically configured to select a track corresponding to the select instruction signal from the playback signal according to the received select instruction signal, and play corresponding track.

In the embodiment, the wearable device 1 is specifically configured to identify a select action signal in the case of action of the user, generate a select instruction signal by the waveform modulation of the select action signal, and send the select instruction signal to corresponding playback unit 3.

In the embodiment, the main unit 2 sends the playback signal to each playback unit 3, so that each playback unit 3 can receive the playback signal. The playback signal includes different tracks, wherein different tracks may correspond to different playback units 3. That is to say, each playback unit 3 may play one track of the playback signal after receiving the playback signal. As illustrated in FIG. 2, description is given in the embodiment by taking four playback units 3 as an example. The playback signal may be divided into four tracks, and each playback unit 3 plays one corresponding track, so that the stereo-mixing effect can be achieved.

The wearable device 1 may send the select instruction signal to corresponding playback unit 3 by Bluetooth, infrared or WIFI communication mode. In the embodiment, according to one example of the present disclosure, the wearable device 1 may send the select instruction signal to corresponding playback unit 3 by infrared communication mode. The wearable device 1 may generate a select instruction signal for a playback unit 3 corresponding to a track after selecting the track. At this point, all the playback units 3 are in the signal receiving status. When the wearable device 1 is aligned to corresponding playback unit 3, the select instruction signal is sent to the aligned playback unit 3 by the means of infrared signal. When receiving the select instruction signal, the playback unit 3 selects a track corresponding to the select instruction signal from the playback signal according to the select instruction signal, and plays corresponding track.

The action signal identification module 11 is configured to identify a select action signal in the case of action of the user. The first signal processing module 12 is configured to generate a select instruction signal by the waveform modulation of the select action signal. The first signal sending module 13 is configured to send the select instruction signal to the second signal receiving module 31 in corresponding playback unit 3. The second signal receiving module 31 is configured to send the select instruction signal to the third control module 33. The second signal receiving module 31 is also configured to send the received playback signal to the third control module 33. The third control module 33 is configured to select a track corresponding to the select instruction signal from the playback signal according to the select instruction signal, and play corresponding track. The audio playback module 32 is configured to play corresponding track.

For instance, the wearable device 1 is also configured to generate a select switch signal in the case of action of the user and send the select switch signal to the main unit 2. The wearable device 1 is specifically configured to generate a select switch action signal in the case of action of the user, generate a select switch signal by the waveform modulation of the select switch action signal, and send the select switch signal to the main unit 2. The main unit 2 is also configured to send the select switch signal to corresponding playback unit 3. Each playback unit 3 can only identify a specific select switch signal corresponding to the playback unit, and switches on or off according to the select switch signal. The select switch signal may include a select on signal or a select off signal. When the select switch signal includes the select on signal, the playback unit 3 is specifically configured to switch on according to the received select on signal and execute the steps of selecting the track corresponding to the select instruction signal from the playback signal according to the received select instruction signal and playing corresponding track. Or when the select switch signal includes the select off signal, the playback unit 3 is also configured to switch off according to the received select off signal and stop executing the steps of selecting the track corresponding to the select instruction signal from the playback signal according to the received select instruction signal and playing corresponding track. For instance, when the action of the finger of the user is drawing one vertical line, the generated select on signal indicates the switching-on of the first playback unit 3. When the action of the finger of the user is drawing two vertical lines, the generated select on signal indicates the switching-on of the second playback unit 3, and so on. When the action of the finger of the user is drawing one horizontal line, the generated select off signal indicates the switching-off of the first playback unit 3. When the action of the finger of the user is drawing two horizontal lines, the generated select off signal indicates the switching-off of the second playback unit 3, and so on. The action signal identification module 11 is configured to identify a select switch action signal in the case of action of the user. The first signal processing module 12 is configured to generate a select switch signal by the waveform modulation of the select switch action signal. The first signal sending module 31 is configured to send the select switch signal to the first signal receiving module 21 of the main unit 2. The second signal processing module 23 is configured to send the select switch signal received by the first signal receiving module 21 to the second signal sending module 24. The second signal sending module 24 is configured to send the select switch signal to the second signal receiving module 31 in corresponding playback unit 3. The second signal receiving module 31 is configured to send the select switch signal to the third control module 33. When the select switch signal includes the select on signal, the third control module 33 is configured to execute the step of selecting the track corresponding to the select instruction signal from the playback signal according to the received select instruction signal, according to the received select on signal, and control the audio playback module 32 to switch on and execute the step of playing corresponding track. Or when the select switch signal includes the select off signal, the third control module 33 is configured to stop executing the step of selecting the track corresponding to the select instruction signal from the playback signal according to the received select instruction signal, according to the received select off signal, and control the audio playback module 32 to switch off and stop executing the step of playing corresponding track. For instance, when the action of the finger of the user is drawing one vertical line, the generated select on signal indicates the switching-on of the audio playback module 32 in the first playback unit 3. When the action of the finger of the user is drawing two vertical lines, the generated select on signal indicates the switching-on of the audio playback module 32 in the second playback unit 3, and so on. When the action of the finger of the user is drawing one horizontal line, the generated select off signal indicates the switching-off of the audio playback module 32 in the first playback unit 3. When the action of the finger of the user is drawing two horizontal lines, the generated select off signal indicates the switching-off of the audio playback module 32 in the second playback unit 3, and so on.

In the technical proposal of the intelligent playback system provided by the embodiment, the wearable device generates the audio instruction signal in the case of action of the user; the main unit divides the audio signal into different tracks, matches different tracks of the audio signal with the audio instruction signal, and obtains the playback signal by the audio processing of the track matched with the audio instruction signal according to corresponding audio processing mode; and the playback unit plays the playback signal. In the embodiment, the wearable device may actively send the instruction of the user to the audio processing device, so that the control of the audio processing device can be achieved, and hence the real-time interaction between the wearable device and the audio processing device can be achieved.

Figure 4:
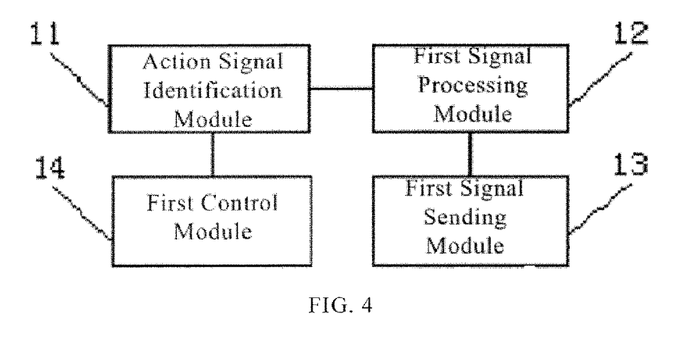
FIG. 4 is a schematic structural view of a wearable device provided by the third embodiment of the present disclosure.

FIG. 4 is a schematic structural view of a wearable device provided by the third embodiment of the present disclosure. As illustrated in FIG. 4, the wearable device includes: an action signal identification module 11, a first signal processing module 12 and a first signal sending module 13.

The action signal identification module 11 is configured to identify an audio action signal in the case of action of the user. The first signal processing module 12 is configured to generate an audio instruction signal by the waveform modulation of the audio action signal. The first signal sending module 13 is configured to send the audio instruction signal to the main unit. The main unit is configured to divide an audio signal into different tracks, match different tracks of the audio signal with the audio instruction signal, obtain a playback signal by the audio processing of a track matched with the audio instruction signal according to corresponding audio processing mode, and send the playback signal to the playback unit. The playback unit is configured to play the playback signal.

For instance, the wearable device further comprises: a first control module 14. The first control module 14 is configured to generate an on signal or an off signal and send the on signal or the off signal to the action signal identification module. The action signal identification module 11 is specifically configured to turn on when receiving the on signal and execute the step of identifying the audio action signal in the case of action of the user, and turn off when receiving the off signal.

For instance, the first control module 14 is configured to generate a vibration mode signal and send the vibration mode signal to the action signal identification module 11. The action signal identification module 11 is also configured to work in accordance with vibration mode after receiving the vibration mode signal. Or the first control module 14 is configured to generate a direction mode signal and send the direction mode signal to the action signal identification module 11. The action signal identification module 11 is also configured to work in accordance with direction mode after receiving the direction mode signal.

For instance, the action signal identification module 11 is also configured to identify a select action signal in the case of action of the user; the first signal processing module 12 is also configured to generate a select instruction signal by the waveform modulation of the select action signal; and the first signal sending module 13 is also configured to send the select instruction signal to corresponding playback unit.

For instance, the action signal identification module 11 is also configured to identify a select switch action signal in the case of action of the user; the first signal processing module 12 is also configured to generate a select switch signal by the waveform modulation of the select switch action signal; and the first signal sending module 13 is also configured to send the select switch signal to the main unit.

In the technical proposal of the wearable device provided by the embodiment, the wearable device generates the audio instruction signal in the case of action of the user; the main unit divides the audio signal into different tracks, matches different tracks of the audio signal with the audio instruction signal, and obtains the playback signal by the audio processing of the track matched with the audio instruction signal according to corresponding audio processing mode; and the playback unit plays the playback signal. In the embodiment, the wearable device may actively send the instruction of the user to the audio processing device, so that the control of the audio processing device can be achieved, and hence the real-time interaction between the wearable device and the audio processing device can be achieved.

Figure 5:
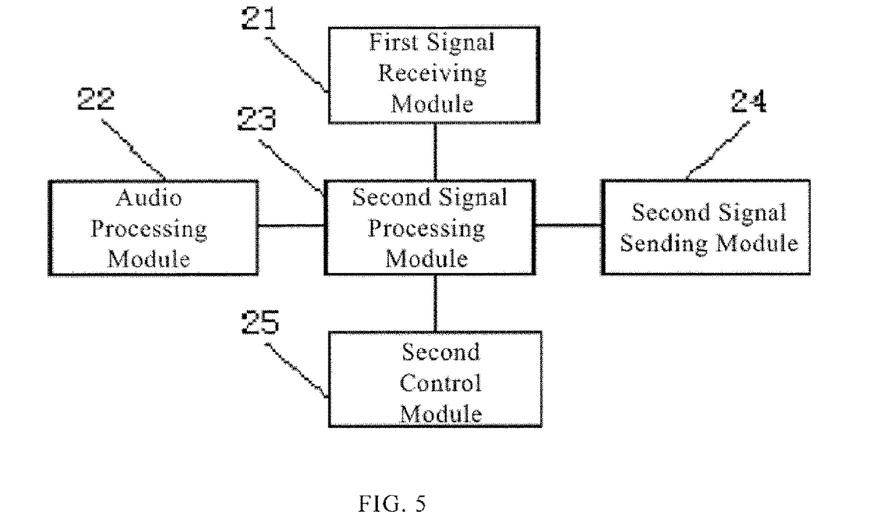
FIG. 5 is a schematic structural view of a main unit provided by the fourth embodiment of the present disclosure.

FIG. 5 is a schematic structural view of a main unit provided by the fourth embodiment of the present disclosure. As illustrated in FIG. 5, the main unit comprises: a first signal receiving module 21, an audio processing module 22, a second signal processing module 23 and a second signal sending module 24.

The first signal receiving module 21 is configured to receive an audio instruction signal sent by a wearable device. The audio instruction signal includes audio processing modes corresponding to different tracks. The audio processing module 22 is configured to divide an audio signal into different tracks. The second signal processing module 23 is configured to match different tracks of the audio signal with an audio instruction signal and obtain a playback signal by the audio processing of a track matched with the audio instruction signal according to corresponding audio processing mode. The second signal sending module 24 is configured to send the playback signal to a playback unit. The playback unit is configured to play the playback signal.

For instance, the main unit further comprises: a second control module 25. The second control module 25 is configured to generate a processing control signal and send the processing control signal to the second signal processing module 23. The processing control signal includes a processing signal or a pending signal. The second signal processing module 23 is specifically configured to execute the steps of matching different tracks of the audio signal with the audio instruction signal and obtaining the playback signal by the audio processing of the track matched with the audio processing mode according to the audio processing mode, when the processing control signal includes the processing signal. Or the second signal processing module 23 is specifically configured to take the audio signal as the playback signal when the processing control signal includes the pending signal.

For instance, the first signal receiving module 21 is also configured to receive a select switch signal sent by the wearable device. The select switch signal includes a select on signal or a select off signal. The second signal processing module 23 is also configured to send the select switch signal received by the first signal receiving module to the second signal sending module 24. The second signal sending module 24 is also configured to send the select switch signal to corresponding playback unit.

In the technical proposal of the main unit provided by the embodiment, the wearable device generates the audio instruction signal in the case of action of the user; the main unit divides the audio signal into different tracks, matches different tracks of the audio signal with the audio instruction signal, and obtains the playback signal by the audio processing of the track matched with the audio instruction signal according to corresponding audio processing mode; and the playback unit plays the playback signal. In the embodiment, the wearable device may actively send the instruction of the user to the audio processing device, so that the control of the audio processing device can be achieved, and hence the real-time interaction between the wearable device and the audio processing device can be achieved.

Figure 6:
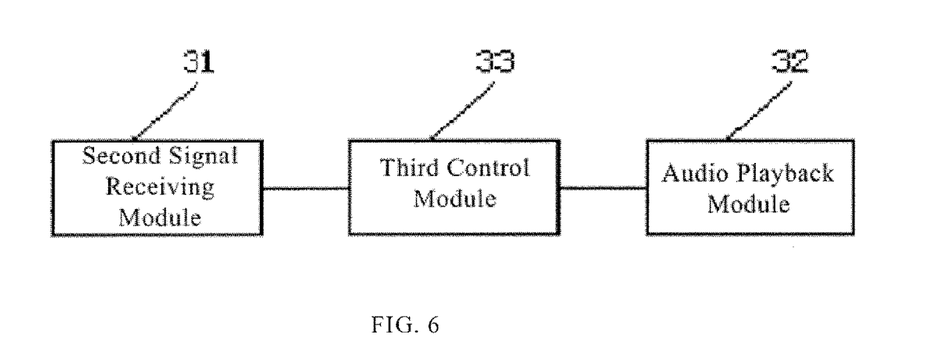
FIG. 6 is a schematic structural view of a playback unit provided by the fifth embodiment of the present disclosure.

FIG. 6 is a schematic structural view of a playback unit provided by the fifth embodiment of the present disclosure. As illustrated in FIG. 6, the playback unit comprises: a second signal receiving module 31 and an audio playback module 32.

The second signal receiving module 31 is configured to receive a playback signal sent by a main unit 2. The main unit 2 is configured to divide an audio signal into different tracks, match different tracks of the audio signal with an audio instruction signal sent by a wearable device, and obtain a playback signal by the audio processing of a track matched with the audio instruction signal according to corresponding audio processing mode. The audio instruction signal includes audio processing modes corresponding to different tracks. The audio playback module 32 is configured to play the playback signal.

For instance, the playback unit further comprises: a third control module 33. The second signal receiving module 31 is also configured to receive a select instruction signal sent by a wearable device 1. The third control module 33 is configured to select a track corresponding to the select instruction signal from the playback signal according to the select instruction signal. The audio playback module 32 is specifically configured to play corresponding track.

For instance, the second signal receiving module 31 is also configured to receive a select switch signal sent by the wearable device 1. When the select switch signal includes a select on signal, the third control module 33 is also configured to execute the step of selecting the track corresponding to the select instruction signal from the playback signal according to the received select instruction signal, according to the received select on signal, and control the audio playback module 32 to switch on and execute the step of playing corresponding track. Or when the select switch signal includes a select off signal, the third control module 33 is also configured to stop executing the step of selecting the track corresponding to the select instruction signal from the playback signal according to the received select instruction signal, according to the received select off signal, and control the audio playback module 32 to switch off and stop executing the step of playing corresponding track.

In the technical proposal of the playback unit provided by the embodiment, the wearable device generates the audio instruction signal in the case of action of the user; the main unit divides the audio signal into different tracks, matches different tracks of the audio signal with the audio instruction signal, and obtains the playback signal by the audio processing of the track matched with the audio instruction signal according to corresponding audio processing mode; and the playback unit plays the playback signal. In the embodiment, the wearable device may actively send the instruction of the user to the audio processing device, so that the control of the audio processing device can be achieved, and hence the real-time interaction between the wearable device and the audio processing device can be achieved.

Figure 7:
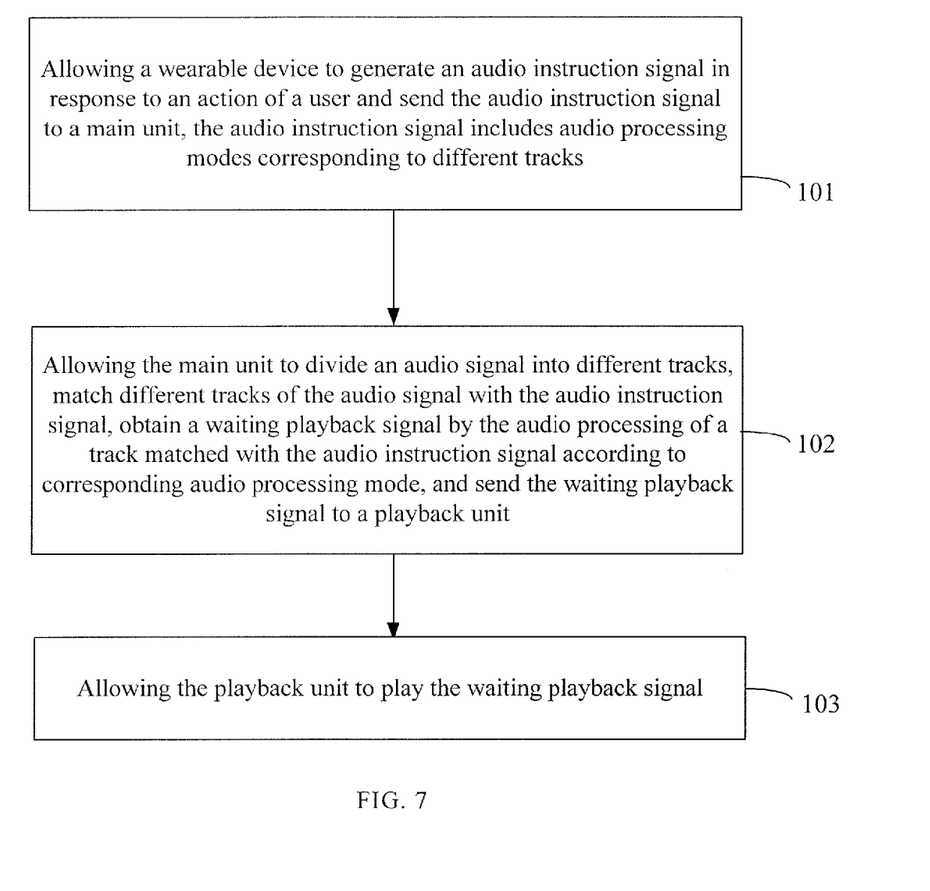
FIG. 7 is a flowchart of an intelligent playback method provided by the sixth embodiment of the present disclosure.

FIG. 7 is a flowchart of an intelligent playback method provided by the sixth embodiment of the present disclosure. As illustrated in FIG. 7, the method comprises:

S101: allowing a wearable device to generate an audio instruction signal in the case of action of a user and send the audio instruction signal to a main unit, in which the audio instruction signal includes audio processing modes corresponding to different tracks.

The step may specifically include: allowing the wearable device to identify an audio action signal in the case of action of the user, generate the audio instruction signal by the waveform modulation of the audio action signal, and send the audio instruction signal to the main unit.

S102: allowing the main unit to divide an audio signal into different tracks, match different tracks of the audio signal with the audio instruction signal, obtain a playback signal by the audio processing of a track matched with the audio instruction signal according to corresponding audio processing mode, and send the playback signal to a playback unit.

S103: allowing the playback unit to play the playback signal.

For instance, the number of the playback units is multiple. Before the step S103, the method may further comprise: allowing the wearable device to generate a select instruction signal in the case of action of the user and send the select instruction signal to corresponding playback unit. The step S103 may specifically include: allowing the playback unit to select a track corresponding to the select instruction signal from the playback signal according to the received select instruction signal, and play corresponding track.

The intelligent playback method provided by the embodiment may be achieved by the intelligent playback system provided by the first embodiment or the second embodiment. The description on the intelligent playback system may refer to the first embodiment or the second embodiment. No further description will be given here.

In the technical proposal of the intelligent playback method provided by the embodiment, the wearable device generates the audio instruction signal in the case of action of the user; the main unit divides the audio signal into different tracks, matches different tracks of the audio signal with the audio instruction signal, and obtains the playback signal by the audio processing of the track matched with the audio instruction signal according to corresponding audio processing mode; and the playback unit plays the playback signal. In the embodiment, the wearable device may actively send the instruction of the user to the audio processing device, so that the control of the audio processing device can be achieved, and hence the real-time interaction between the wearable device and the audio processing device can be achieved.

Those skilled in the art can make various modifications and variations to the present disclosure without departing from the spirit and scope thereof. Thus, if these modifications and variations of the present disclosure are within the scope of the claims of the invention as well as their equivalents, the present disclosure is also intended to include these modifications and variations.

The application claims priority to the Chinese patent application No. 201610082379.4, filed Feb. 5, 2016, the disclosure of which is incorporated herein by reference as part of the application.

What is claimed is:

1. An intelligent playback system, comprising: a wearable device, a main unit and a playback unit, wherein the wearable device is configured to generate an audio instruction signal in the case of action of a user and send the audio instruction signal to the main unit, the audio instruction signal includes audio processing modes corresponding to different tracks;

the main unit is configured to process an audio signal on the basis of the audio instruction signal, generate a playback signal, and send the playback signal to the playback unit; and the playback unit is configured to play the playback signal;

wherein the main unit is configured to perform an operation of processing the audio signal or an operation of not processing the audio signal according to an indication from the user, the operation of processing the audio signal comprises: dividing the audio signal into the different tracks, matching the different tracks of the audio signal with the audio instruction signal, obtaining the playback signal by the audio processing of a track matched with a corresponding audio processing mode according to the corresponding audio processing mode, and sending the playback signal to the playback unit;

the operation of not processing the audio signal comprises: taking the audio signal as the playback signal and send the playback signal to the playback unit, wherein the indication from the user is generated by the wearable device, the wearable device is also configured to generate a switch instruction signal in the case of the action of the user as the indication from the user, and send the switch instruction signal to the main unit, in which the switch instruction signal includes a start instruction or an end instruction, the start instruction corresponds to the operation of processing the audio signal and is indicated by a cross, and the end instruction corresponds the operation of not processing the audio signal and is indicated by a straight line.

2. The intelligent playback system according to claim 1, wherein the wearable device is specifically configured to identify an audio action signal in the case of action of the user, generate the audio instruction signal by processing the audio action signal, and send the audio instruction signal to the main unit.

3. The intelligent playback system according to claim 2, wherein the process of generating the audio instruction signal by processing the audio action signal includes the step of performing waveform modulation on the audio action signal.

4. The intelligent playback system according to claim 1, wherein the wearable device is also configured to generate the audio instruction signal when identifying the vibration action of the user or generate the audio instruction signal when identifying the direction change action of the user.

5. The intelligent playback system according to claim 1, wherein the number of the playback units is multiple;

the wearable device is also configured to generate a select instruction signal in the case of action of the user, and send the select instruction signal to corresponding playback unit; and the playback unit is configured to select a track corresponding to the select instruction signal from the playback signal according to the received select instruction signal, and play corresponding track.

6. The intelligent playback system according to claim 5, wherein the wearable device is also configured to generate a select switch signal in the case of action of the user, and send the select switch signal to the main unit, in which the select switch signal includes a select on signal or a select off signal;

the main unit is also configured to send the select switch signal to corresponding playback unit;

the playback unit is also configured to switch on according to the select on signal, and execute the step of selecting the track corresponding to the select instruction signal from the playback signal according to the received select instruction signal and playing corresponding track, when the select switch signal includes the select on signal; or the playback unit is also configured to switch off according to the select off signal, and stop executing the step of selecting the track corresponding to the select instruction signal from the playback signal according to the received select instruction signal and playing corresponding track, when the select switch signal includes the select off signal.

7. A wearable device, comprising: an action signal identification module, a first signal processing module and a first signal sending module, wherein the action signal identification module is configured to identify an audio action signal in the case of action of a user;

the first signal processing module is configured to generate an audio instruction signal by processing the audio action signal, the audio instruction signal includes audio processing modes corresponding to different tracks; and the first signal sending module is configured to send the audio instruction signal to indicate the play of audio data;

wherein the action signal identification module is also configured to generate a switch action signal in the case of action of the user;

the first signal processing module is also configured to generate a switch instruction signal by processing the switch action signal, the switch instruction signal comprises a start instruction or an end instruction, the start instruction is indicated by a cross, and the end instruction is indicated by a straight line; and the first signal sending module is also configured to send the switch instruction signal to a main unit to process of the audio data, wherein the main unit is configured to divide the audio signal into the different tracks, match the different tracks of the audio signal with the audio instruction signal, obtain a playback signal by the audio processing of a track matched with a corresponding audio processing mode according to the corresponding audio processing mode, and send the playback signal to the playback unit, when the switch instruction signal includes the start instruction; or the main unit is also configured to take the audio signal as the playback signal and send the playback signal to the playback unit when the switch instruction signal includes the end instruction.

8. The wearable device according to claim 7, wherein the wearable device further comprises: a first control module;

the first control module is configured to generate an on signal or an off signal and send the on signal or the off signal to the action signal identification module; and the action signal identification module is further configured to turn on to execute the audio action signal identified in the case of action of the user when receiving the on signal, and turn off when receiving the off signal.

9. The wearable device according to claim 8, wherein the first control module is configured to generate a vibration mode signal and send the vibration mode signal to the action signal identification module, and the action signal identification module is also configured to work in accordance with the vibration mode after receiving the vibration mode signal; or the first control module is configured to generate a direction mode signal and send the direction mode signal to the action signal identification module, and the action signal identification module is also configured to work in accordance with the direction mode after receiving the direction mode signal.

10. The wearable device according to claim 7, wherein the action signal identification module is also configured to identify a select action signal in the case of action of the user;

the first signal processing module is also configured to generate a select instruction signal by processing the select action signal; and the first signal sending module is also configured to send the select instruction signal to indicate the play of audio data.

11. A main unit, configured to perform an operation of processing an audio signal or an operation of not processing the audio signal according to an indication from the user and comprising: a first signal receiving module, an audio processing module, a second signal processing module and a second signal sending module, wherein the first signal receiving module is configured to receive an audio instruction signal sent by a wearable device, the audio instruction signal includes audio processing modes corresponding to different tracks;

the second signal processing module is configured to obtain a playback signal by processing an audio signal on the basis of the audio instruction signal; and the second signal sending module is configured to send the playback signal for the play of the playback signal;

wherein the indication from the user generated by the wearable device, the wearable device is also configured to generate a switch instruction signal in the case of the action of the user as the indication from the user, and send the switch instruction signal to the main unit, in which the switch instruction signal includes a start instruction or an end instruction, the start instruction corresponds to the operation of processing the audio signal and is indicated by a cross, and the end instruction corresponds the operation of not processing the audio signal and is indicated by a straight line, the second signal processing module is configured to perform the operation of processing the audio signal when the switch instruction signal includes the start instruction, in which the operation of processing the audio signal comprises: dividing the audio signal into the different tracks, matching the different tracks of the audio signal with the audio instruction signal, and obtaining the playback signal by the audio processing of a track matched with a corresponding audio processing mode according to the corresponding audio processing mode, or the second signal processing module is also configured to perform the operation of not processing the audio signal when the switch instruction signal includes the end instruction, in which the operation of not processing the audio signal comprises: taking the audio signal as the playback signal.

12. The main unit according to claim 11, wherein the first signal receiving module is also configured to receive a select switch signal sent by the wearable device; the select switch signal includes a select on signal or a select off signal;

the second signal processing module is also configured to send the select switch signal received by the first signal receiving module to the second signal sending module; and the second signal sending module is also configured to send the select switch signal to corresponding playback unit.

* * * * *